March 4, 1941.  H. R. LEE  2,233,670
GAFFING DEVICE
Filed April 24, 1939
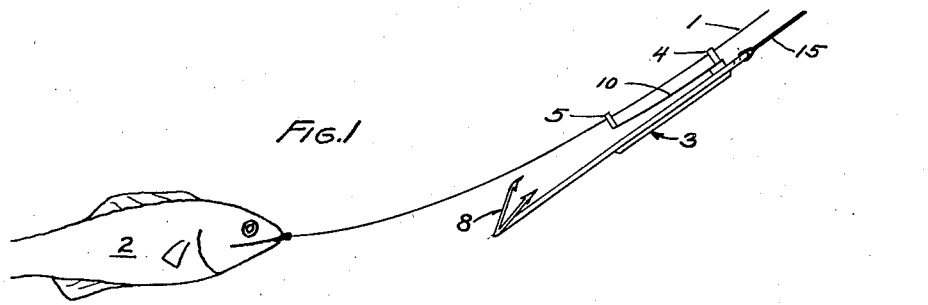
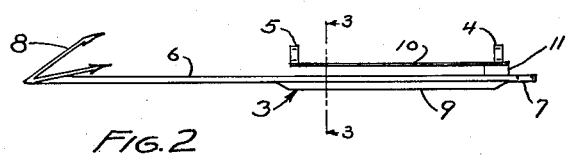
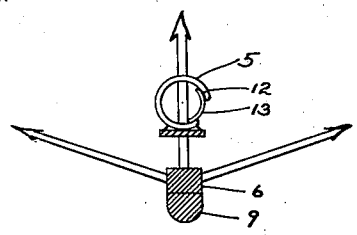
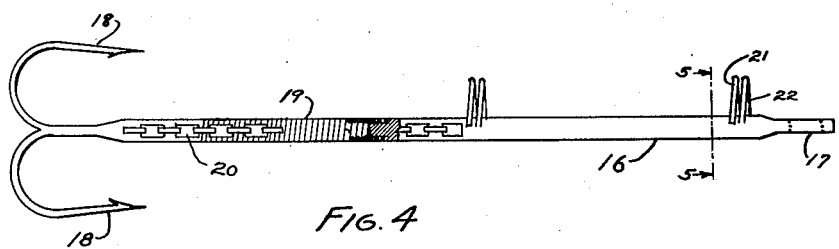
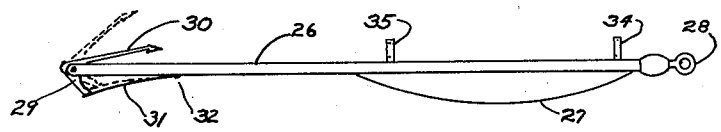
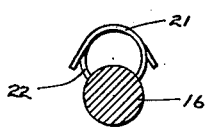
HAROLD R. LEE
INVENTOR
BY
ATTORNEY Patented Mar. 4, 1941

2,233,670

UNITED STATES PATENT OFFICE 2,233,670

GAFFING DEVICE

Harold R. Lee, Ventura, Calif.

Application April 24, 1939, Serial No. 269,564

6 Claims. (Cl. 43—5)

The present invention relates to a fish gaff and is distinguishable from ordinary gaffs in that it is operated at a distance by means of a gaff line. Ordinarily, fish are caught on bait hooks and ordinary light fish lines. After the fish has been snagged or caught on the fish hook, it is carefully brought up to the surface and is then removed from the water by means of a gaff which ordinarily is a large hook mounted upon one end of a pole or handle. In a great many instances, however, as for example on fishing barges, piers, etc., it is impossible to reach the fish even after it is brought to the surface of the water since the fisherman is stationed at a considerable elevation above the surface of the water. In many other instances, a fish greatly exceeding the strength of the fish line used is caught and under such conditions any attempt to bring the fish to the surface results in the loss of tackle and fish.

The present invention comprises a running gaff which is capable of being operated from a remote point, and generally stated comprises a device which can be removably and slidably attached to the fish line on which a large fish has been caught, the travelling gaff then sliding down the fish line and firmly hooking the fish. The travelling gaff is equipped with a heavy line so that after the fish has been impaled upon the running gaff, the gaff together with the fish may be pulled to the surface of the water in a very ready and safe manner.

An object of the present invention, therefore, is to disclose and provide a running gaff.

Another object is to provide a running gaff adapted to be slidably and removably attached to a fishing line.

A still further object is to provide a running gaff including adjustable and yieldingly carried gaff hooks which facilitate and insure secure gaffing of the fish.

These and other objects will be apparent to those skilled in the art from the following description. In order to facilitate understanding, reference will be had to the appended drawing showing certain illustrative forms of the invention.

In the drawing:

Fig. 1 is a side elevation showing the manner in which the running or travelling gaff of this invention may be used.

Fig. 2 is an enlarged side elevation of the gaff.

Fig. 3 is a section taken along the plane 3—3 of Fig. 2.

Fig. 4 is a side elevation of a modified form of running gaff.

Fig. 5 is a section taken along the plane 5—5 of Fig. 4.

Fig. 6 is a side elevation of a still further modification.

By referring to Fig. 1, the normal hook carried by the end of the fishing line 1 has been taken by the fish 2. It is assumed that the fish is so large as to render it dangerous to attempt to raise the fish to the surface. The fisherman therefore takes the running gaff, generally indicated at 3, and slidably attaches the same to the fishing line 1 by threading the fishing line 1 into the guides 4 and 5, whereupon the running gaff is permitted to slide down the fishing line 1. In Fig. 1 such gaff is shown approaching the fish.

By referring to Figs. 2 and 3, it will be seen that the running gaff 3 comprises an elongated body portion 6 provided with means for attaching a heavy line thereto at one end as, for example, the eye 7. The body portion carries the gaff hooks 8 at the opposite end. One, two, three or even more gaff hooks may be carried at such end. The body portion 6 also preferably carries a small fin or weighted member 9. Extending from the body portion in a longitudinal parallel relation is a leaf spring 10. Such leaf spring is attached to the body portion 6 as by means of the block 11 adjacent the eye end 7 of such body portion. The leaf spring 10 is preferably equal in length to between about one-third and two-thirds of the length of the body portion 6. Such leaf spring carries the guiding eyes or loops 5 and 4. By referring to Fig. 3 it will be seen that in the construction illustrated the guiding eye 5 comprises a ring brazed, welded or otherwise attached to the spring and having an opening 12, such opening being closed by a light leaf spring 13, one end of which is attached to the ring adjacent the opening 12 while the other end is resiliently held against the opposite end of the ring. The fishing line 1 can therefore be readily passed into the guiding eye 5 through the port 12 and past the leaf spring 13.

While sliding down the fish line 1 the gaff hooks 8 will spring away from the fishing line 1 by reason of the resiliency of the leaf spring 10. The gaffing line is attached to the eye 7 and is indicated at 15. After the running or travelling gaff reaches the fish or reaches the bottom of its travel (as, for example, by contact of the forward guide 5 with the end of the hook or with the fish), the fisherman can give the gaff line 15 a jerk or pull, such jerk or pull tending to straighten the gaff and drive the gaff hooks 8 under the jaw or head of the fish. The fish thus becomes securely impaled upon the gaff hooks, whereupon the fish, irrespective of its size, can now be drawn to the surface and landed by simply drawing in on the gaff line 15, the lighter fish line 1 being thus relieved of undue strain.

The flexible or resilient relationship of the gaff hooks to that portion of the device which is actually slidably related to a fishing line is an important element of this invention. In the form of device shown in Fig. 4, the rear portion of the travelling gaff, indicated at 16, may comprise a solid bar having an eye 17 to which the gaff line may be attached. Gaffing hooks are indicated at 18 and such gaffing hooks are flexibly and resiliently connected to the body portion 16 as by means of a coil of wire 19. In order to prevent undue stretching of such coiled spring 19, a link chain 20 may connect the body portion 16 with the base of the hooks 18, such chain permitting flexibility of such end portion without unnecessary or unrestricted stretching of the coil 19.

The guiding eyes shown in Figs. 4 and 5 comprise curved members 21 and 22 attached to the body portion 16 and bent toward each other from opposite sides into overlapping relation so as to permit the fishing line to be threaded therebetween into the opening or loop thus formed by the prongs. While travelling down a fishing line, the gaff hooks 18 will bend downwardly or will slide under the head of the fish by reason of the flexible connection 19 but any pull on the gaff line will immediately drive such gaff hooks into the fish.

In the embodiment shown in Fig. 6, the body portion 26 of the running gaff is provided with a downwardly extending rear fin 27 and an eye 28 is attached to the rear end by means of a swivel connection. The forward end of the body portion 26 is bifurcated and carries a pivotally mounted member 29 provided with the gaff hook or hooks 30. In effect, the member 29 is a bell crank lever, the hook 30 forming the long arm and a leaf spring 31 bears against the shorter arm of the member 29, yieldably urging the gaff hook 30 into the position indicated in dotted lines in Fig. 6.

The leaf spring 31 is attached to the body member as for example at 32. Suitable guide eyes are indicated at 34 and 35. This device is employed in substantially the same manner as those previously described herein, the gaff hook 30 sliding beneath the fish (as shown in full lines) and snapping into upright position (indicated in dotted lines) as soon as a pull is exerted on the gaff by means of the gaff line.

Numerous changes and modifications may be made as will be appreciated by those skilled in the art. All changes, modifications and adaptations coming within the scope of the appended claims are embraced thereby.

This application is a continuation-in-part of my prior application Serial No. 193,275 filed March 1, 1938.

I claim:

1. A fish gaff comprising an elongated body portion provided with means for attaching a gaff line thereto at the rear thereof; a pair of longitudinally spaced guide means associated with the elongated body portion for releasably and slidably attaching the gaff to a fishing line whereby the gaff is positively guided along a fishing line; and rearwardly and upwardly extending gaff hooks carried by the body portion below and ahead of said guide means, said gaff hooks being resiliently mounted with respect to said guide means whereby said gaff hooks may yieldingly slide under a fish and be driven into a fish by pulling on a gaff line to move the gaff in a direction away from the fish.

2. A fish gaff comprising an elongated body portion provided with means for attaching a gaff line to the rear end thereof, a gaff hook assembly at the front end thereof, a guide adjacent the rear end of said body portion, another guide carried by the top of said body portion and spaced from the gaff hook assembly and from the first named guide, said guides being releasably attachable to a fishing line, and spring means for yieldably urging the gaff hook assembly into engagement with a fish.

3. An elongated fish gaff having guide means on one side thereof adapted to be releasably and slidably attached to a fishing line, means at the rear of said gaff for attaching a line thereto, and a gaff hook assembly yieldably carried at the front end of said gaff, said assembly including hooks, and spring means for permitting said hooks to pass beneath a fish and to urge said hooks into the fish when the gaff is pulled in a direction away from the fish.

4. A fish gaff comprising an elongated body portion, means for attaching a line to the rear of said body portion, a longitudinally extending leaf spring having one end attached to the body portion adjacent the rear end thereof, a pair of spaced guide means carried by the spring and adapted to be releasably and slidably attached to a fishing line, and a gaff hook assembly carried by the front end of said body portion ahead of said spring.

5. An elongated fish gaff having a pair of spaced guide means on the upper side thereof adapted to be releasably and slidably attached to a fishing line, and a gaff hook assembly yieldably carried at the front end of said gaff in advance of said guide means, said assembly including upwardly and rearwardly extending hooks and spring means for permitting said hooks to pass beneath a fish and urge said hooks into a fish when said gaff is pulled away from the fish.

6. An elongated fish gaff having guide means on one side thereof adapted to be releasably and slidably attached to a fishing line, means at the rear end of the gaff for attaching a gaff line thereto, and a gaff hook assembly yieldably carried at the front end of said gaff, said assembly including gaff hooks carried by a lever member pivotally mounted on the front end of said gaff and spring means for yieldably urging said hooks into engagement with the fish.

HAROLD R. LEE.